United States Patent [19]
Feigenbaum et al.

[11] Patent Number: 5,307,497
[45] Date of Patent: Apr. 26, 1994

[54] DISK OPERATING SYSTEM LOADABLE FROM READ ONLY MEMORY USING INSTALLABLE FILE SYSTEM INTERFACE

[75] Inventors: Barry A. Feigenbaum, Boca Raton, Fla.; Rodney P. Springhetti, Toronto, Canada

[73] Assignee: International Business Machines Corp., Armonk, N.Y.

[21] Appl. No.: 543,274

[22] Filed: Jun. 25, 1990

[51] Int. Cl.$^5$ .................. G06F 9/445; G06F 9/44
[52] U.S. Cl. .................. 395/700; 364/975.2; 364/975.4; 364/DIG. 2
[58] Field of Search .................. 395/700; 364/900, 200

[56] References Cited

U.S. PATENT DOCUMENTS

| | | | |
|---|---|---|---|
| 4,142,232 | 2/1979 | Harvey | 364/200 |
| 4,462,086 | 7/1984 | Kurakake | 364/900 |
| 4,654,783 | 3/1987 | Veres et al. | 364/200 |
| 4,688,172 | 8/1987 | Wright | 364/200 |
| 4,757,533 | 7/1988 | Allen et al. | 380/25 |
| 4,811,240 | 3/1989 | Ballou et al. | 364/518 |
| 5,134,580 | 7/1992 | Bertram et al. | 395/650 |

OTHER PUBLICATIONS

Murray Sargent and Richard L. Shoemaker II: "The IBM Personal Computer from the Inside Out", 1984, pp. 26, 418.

*Primary Examiner*—Gareth D. Shaw
*Assistant Examiner*—Michael T. Richey
*Attorney, Agent, or Firm*—Bruce D. Jobse; Douglas R. McKechnie; Anibal J. Cortina

[57] ABSTRACT

A data processing system, such as a personal computer, contains bootable DOS programs that are stored in a ROM as an alternate file system in which the files are stored in packed format. When the system is powered on, the programs are rapidly booted up or loaded from ROM into RAM and executed to "instantly" (as it appears to the user) place the system in operation.

17 Claims, 4 Drawing Sheets

DISK OPERATING SYSTEM LOADABLE FROM READ ONLY MEMORY USING INSTALLABLE FILE SYSTEM INTERFACE

FIELD OF THE INVENTION

This invention relates to the field of data processing, and, more particularly, to a method and apparatus for loading a personal computer disk operating system (DOS) from a read only memory (ROM) using an installable file system (IFS) interface.

BACKGROUND OF THE INVENTION

For the past several years, different versions of IBM DOS, also known as PC DOS, have been marketed for use with data processing systems such as the IBM PC, XT, AT and PS/2 personal computers. The different versions of DOS and the different models of the personal computers are well known and documented. IBM DOS version 4.00 represents the current state of the art and was designed for use with and to support IBM PS/2 personal computers. When such personal computers are powered up, a power on self test (POST) routine or program is first executed, such program being stored in ROM. Upon the successful completion of such test, portions of DOS are read into the system memory from a hard disk or a floppy diskette and the system is booted up and initialized. The test, booting and initialization process can take many seconds. The present invention is directed to an improvement by which such process is significantly shortened in time. It is also common to start a personal computer by turning on not only a system unit but also a display, and the invention has an objective of accomplishing the start up process so that the system is available for use within the time required to warm up the display. That is, as soon as the system is turned on, the first screen becomes immediately visible on a display and gives the user the appearance of an "instant" load and initialization.

It is also known that the speed at which a ROM can be accessed is several orders of magnitude faster than the speed at which a hard disk or a floppy diskette can be accessed. The invention takes advantage of this known speed difference by storing portions of DOS in a ROM where such portions can be accessed at a speed much faster than the speed at which DOS could be accessed if such portions of DOS were stored on a hard disk or floppy diskette. However, the invention is more than simply substituting a ROM for a disk because of several problems. A first thought that might occur to many persons is that by storing DOS in a ROM, DOS can then be executed directly from the ROM. However, while certain portions of DOS, such as commands in the COMMAND.COM program, can be executed directly from ROM, other portions, such as IBMBIO.COM and IBMDOS.COM are altered and cannot be used in a read only device which precludes any alteration.

Another solution that might occur would be to create the ROM within the DOS address space, or within the first one megabyte of memory mapped space, and then load or copy DOS into a RAM (random access memory) within such address space to occupy and execute from the same space in RAM and operate in the same manner as DOS currently does. The disadvantage of such a solution is that two copies of DOS would then exist in such limited address space, one copy being the unalterable ROM DOS and the other copy being the alterable one that is stored in and executed from the RAM. Having two copies of essentially the same program in such a limited address space would not be efficient use of memory nor acceptable by many users.

A concept that has been only relatively recently introduced by IBM into the field of personal computers is that of an installable file system. An IFS was designed to allow alternate file systems to be used with DOS and OS/2. Previously, only the well known file allocation table (FAT) file system was supported. An IFS was a feature of DOS version 4.00 which was used for a network file system to interconnect a personal computer and a network server. An IFS was also included in OS/2 version 1.2 and used for the high performance file system (HPFS) designed for high performance, large capacity disk drives.

In the course of arriving at the solution to the problem of how DOS could be loaded from a ROM, we made a double observation. First, is there a way to make ROM look like a hard disk file? If so, then DOS could be used in its previous form without having to make many changes. Second, we then recognized that the IFS interface and concept allows a ROM to be used as a disk image. Such solution was advantageous in several ways. Since few changes need be made to DOS, the invention could be developed rapidly. Fewer changes makes the resultant program more reliable and of higher quality.

The foregoing describes in general terms the prior art being improved upon, and such prior art is also believed to be the most pertinent or relevant to the invention. However, certain patents are also known which describe inventions using programs stored in ROM to initialize computers. U.S. Pat. No. 4,757,533—Allen et al for SECURITY SYSTEM FOR MICROCOMPUTERS, discloses a personal computer security system which is initialized using the prior art process. When DOS processes the AUTOEXEC.BAT file, code is accessed in a ROM to set up the security system. Obviously, such system does not load an operating system from ROM but operates in accordance with the prior art being improved upon by the present invention.

U.S. Pat. No. 4,688,172- Wright, for INITIALIZATION APPARATUS FOR A DATA PROCESSING SYSTEM WITH A PLURALITY OF INPUT/OUTPUT AND STORAGE CONTROLLER CONNECTED TO A COMMON BUS, discloses a data processing system which is initialized from a ROM in a manner to solve a problem different from that solved by the present invention. The invention is directed to initializing a computer using a DOS stored in ROM. The patent does not appear to utilize DOS nor teach how to initialize such a system. The patent is directed to solving the problem of how to initialize a data processing system having a plurality of programmable controllers which during normal operation compare addresses with stored identifiers to see which controller is being accessed. When the system is turned on, such identifiers are stored on disk and are not yet loaded, and that creates the problem. The solution to such problem is to disable the use of identifiers during initialization and access only a master controller with normal addresses excluding an identifier. Such solution differs from and does not teach the present invention.

U.S. Pat. No. 4,462,086—Kurakake, for LOADING SYSTEM IN NUMERICAL CONTROLLER, discloses a system having a main processor for executing programs in a RAM. The system also has a subprocessor including a ROM storing a loading program and a control program. When power is turned on, the main processor transfers the loading program from the subprocessor ROM into RAM or executes it directly from the ROM to load the control program from the ROM into RAM. The present invention does not employ a subprocessor having a ROM therein. Such patent does not teach how to initialize a DOS based system from ROM and overcome the problems associated therewith.

U.S. Pat. No. 4,654,783—Veres et al, for UNIQUE PROCESS FOR LOADING A MICROCODE CONTROL STORE IN A DATA PROCESSING SYSTEM, discloses a non-DOS based system having a microcode control store. The purpose of the described invention is to load one of a plurality of different microcode instruction sets stored on different floppy discs. When power is turned on, a kernel program stored in a ROM is loaded into the microcode control store. The kernel first tests the system and then accesses an I/O device to load a loading program from the I/O device which loading program then loads the desired microcode instruction set from the I/O device into the control store. The processor then, acting under the control of the microcode, loads an operating system to place the system in use. In the present invention, the loading program and the operating system are not stored in nor loaded from an I/O device but from ROM.

SUMMARY OF THE INVENTION

One of the objects of the invention is to provide a ROM based DOS that rapidly tests, boots, and initializes a personal computer and appears to the user to "instantly" start up when the computer is turned on.

Another object is to store a DOS kernel in a ROM in a simple, efficient file structure that can be rapidly accessed using less code than that required to access a DOS kernel stored on a disk in a FAT file system.

A further object is to provide a ROM based DOS which uses an IFS that is accessible at the system level, as opposed to the device level, to rapidly load DOS programs from ROM into RAM for execution from such RAM.

Still another object is to provide a ROM based DOS in which at least certain DOS programs that are stored on a disk or diskette in a FAT file system, are stored in the ROM using an alternate file system.

A still further object is to provide improved method and apparatus for rapidly initializing a personal computer when it is turned on, which method and apparatus uses an IFS to access DOS programs stored in a ROM in a packed format differing from the format used to store such programs in a FAT file system.

Briefly, in accordance with the subject invention, bootable DOS programs are stored in a ROM as an alternate file system in which the files are stored in packed format. When the system is powered on, the programs are rapidly booted up or loaded from ROM into RAM and executed to "instantly" (as it appears to the user) place the system in operation.

DRAWINGS

Other objects and advantages of the invention will be apparent from the following description taken in connection with the accompanying drawings wherein.

DETAILED DESCRIPTION

Figure 1:
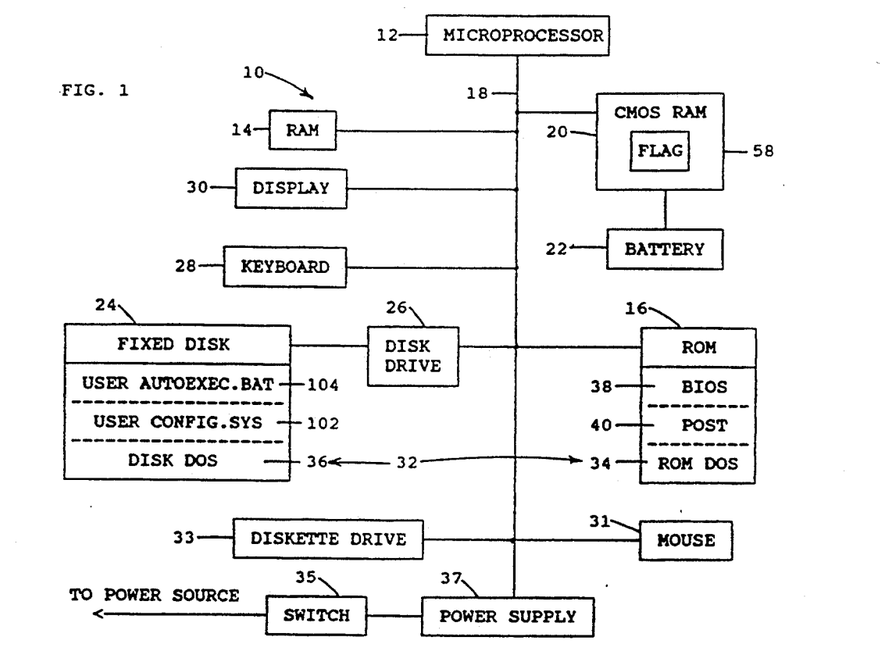
FIG. 1 is a block diagram of a data processing system embodying the invention.

Referring now to the drawings, and first to FIG. 1, the invention is embodied in a personal computer system 10, and resides in the manner in which such system is programmed and operated. It is to be appreciated that such computers are complex and include many components and data processing devices, such as device controllers and adapters, which have been omitted from the drawings for simplicity of illustration. The description provided herein is limited to only those items which are useful in understanding the invention. System 10 includes a microprocessor 12, such as an Intel 80286 microprocessor, which is commercially available and functions in a known manner to execute programs stored in a RAM 14 and a ROM 16. Such ROM preferably comprises a plurality of ROM units which together form ROM 16 and provide sufficient storage capacity for all of the stored information described in more detail below.

System 10 also includes a circuit or bus network 18 operatively interconnecting the various elements of the system. A complementary metal oxide semi-conductor (CMOS) RAM 20 is connected to and backed up by a battery 22 to provide non-volatile storage. A disk drive 26 includes a fixed disk 24 for storing information in a FAT file system. Drive 26 and CMOS RAM 20 are also connected to bus 18.

The FAT file system is well known and is in accordance with the prior art. It is described in several publications including IBM DISK OPERATING SYSTEM TECHNICAL REFERENCE, July 1988, published by IBM, and THE NEW DOS 4.0, K. W. Christopher Jr, B. A. Feigenbaum, and S. O. Saliga, 1989, published by John Wiley and Sons Inc., to which reference may be had for a more detailed description thereof. Briefly, in a FAT file system, a disk is divided into clusters of 512 byte sectors. A file is stored in one or more clusters dependent upon the file length. The disk also contains a boot record, a file allocation table (FAT), a root directory, and a data area containing subdirectories and files. The directory is a tree structured directory system. A given file is found by specifying the drive it is on, the directory path, and a filename, e.g., c:/dir1/dir2-/filename.ext.

System 10 also includes a keyboard 28 and a display 30 that allow a user to respectively input data and commands into the system and view output from the system. A mouse 31 and a floppy diskette drive 33 are connected to bus 18. A switch 35 is connected between a power source (not shown) and a power supply 37 that distributes electrical power to the various components of system 10 through power distribution lines included in bus network 18. Switch 35 is selectively actuated or operated to power or turn system 10 on and off. When switch 35 is initially turned on, display 30 warms up within a relatively short period and the ROM based booting and system initialization, described in detail below, occurs within the period required for the display to warm up so that at the end of such period, the display screen becomes visible to the user to give the appearance of an instant startup.

System 10 is further provided with a DOS 32 that comprises two major portions, ROM DOS 34 and DISK DOS 36 respectively stored in ROM 16 and disk 24. ROM DOS 34 includes the programs that are booted into the RAM when the system is initially powered on or when the system is reset, which programs provide the minimum level of operating system support to make system 10 operational to the user. The remaining portions of DOS, i.e. those programs and files that together form a complete DOS, are included in DISK DOS 36. DISK DOS 36 further includes DOS programs similar to those in ROM DOS so that the system can be booted up and operated from disk 24 at the option of the user, as described in more detail hereafter. Also stored in ROM 16 are a basic input/output system (BIOS) 38 and a power on self test (POST) routine 40. When system 10 is first turned on, or when it is re-started, POST 40 first performs the test and upon successful completion, it boots or loads a portion of DOS and transfers control to it in the manner described in detail below. Except for ROM DOS 34, the system as thus far described is constructed and operates in accordance with known principles of the prior art.

Figure 2:
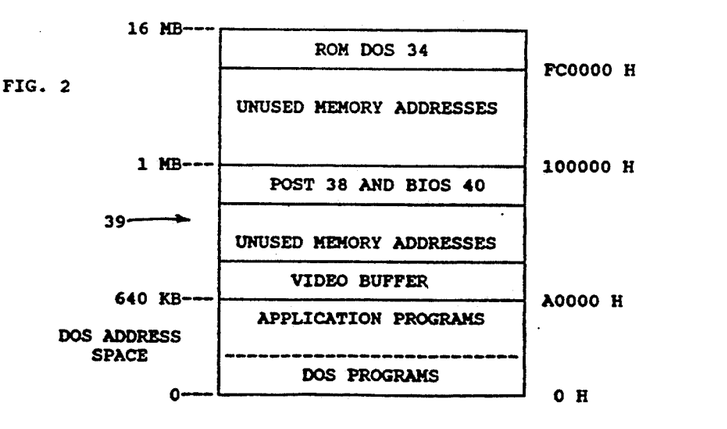
FIG. 2 is a memory map illustrating certain aspects of the invention.

With reference to FIG. 2, a memory map 39 is illustrated based on the full address space of sixteen megabytes (MB) using the twenty-four bit addressing capability of microprocessor 12. The lowest 640 kilobytes (KB) are assigned to RAM 14 and form a storage area, known as the DOS address space, for containing DOS programs in the lowest portion thereof and application programs in the upper or top portion thereof. Addresses immediately below the one megabyte (MB) region are assigned to that portion of ROM 20 containing POST 38 and BIOS 40. A video buffer occupies the space immediately above the DOS address space beginning at hex address A0000 H. ROM DOS 34 occupies a 256KB region at the top of the 16 MB address space beginning at hex address FC0000 H. Thus, the lowest one MB region is assigned to the same addresses and functions as such region is used in the prior art, while ROM DOS 34 is assigned to an address space which is not immediately addressable by DOS nor application programs running in the DOS address space. The remaining regions are unused memory addresses. Further, the low 1MB address range is accessible in the real mode of operation of microprocessor 12, while the address range above the real mode range is accessible in protected mode.

Figure 3:
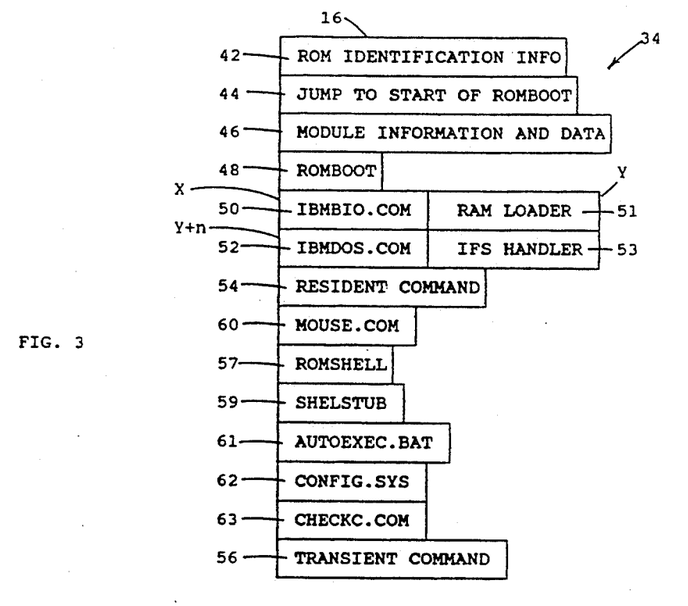
FIG. 3 is schematic diagram of a ROM unit storing DOS programs and data.

Referring to FIG. 3, ROM DOS 34 includes various files for loading the DOS kernel and starting system 10 with a shell program. The first 512 bytes comprise ROM identification information 42, a jump instruction 44, module information and data 46, and a ROM BOOT program 48. ROM DOS 34 further includes an IBMBIO.COM program 50 including a RAM LOADER 51, an IBMDOS.COM program 52 including an IFS handler 53, a resident COMMAND program 54, a transient COMMAND program 57, a SHELSTUB program 59, a ROMSHELL program 57, a mouse driver MOUSE.COM 60, an AUTOEXEC.BAT file 61, a CONFIG.SYS file 62, and a CHECKC.COM program 63. Items 42 through 48 are stored in the first 512 bytes of ROM DOS 34 and are comparable to the conventional bootstrap record stored in the first sector of disk 24. The final steps performed by POST 40 are to copy the first 512 bytes of ROM DOS 34 into RAM 14 and then to transfer control, by a jump instruction, to jump instruction 44 which in turn jumps to the start of ROM BOOT program 48.

Programs 50 through 56 provide the minimum level of operating system support for operating data processing system 10. IBMBIO.COM 50 (except for RAM LOADER 51), IBMDOS.COM 52 (except for IFS handler 53), and COMMANDS 54 AND 56 (which together form the conventional COMMAND.COM DOS program) comprise the conventional DOS kernel. IBMBIO.COM provides low level device support. IBMDOS.COM provides application support. COMMAND.COM is the command processor. COMMAND 54 stays resident in RAM 14 once it is loaded while COMMAND 56 can be overlaid and later copied into RAM 14 as needed. ROMSHELL 57 provides a graphical user interface and is transient while SHELSTUB 59 is designed to be resident in the RAM for reloading the ROMSHELL program after quitting an application. The ROM DOS 34 programs when loaded into the RAM generally operate the same as the corresponding programs in DISK DOS 36, the only difference being that such programs are loaded from ROM 16 instead of disk 24. Relative to other portions of DOS and the system, ROM DOS 34 is transparent and appears to act the same as corresponding portions of DISK DOS 36. The ROM DOS files are stored in ROM 16 outside of the address space available for DOS programs, and RAM LOADER 51 is able to work outside such address space to copy such programs into the DOS address space in RAM 14. RAM LOADER 51 uses a standard method of moving blocks of data from the protected mode address space into the real mode DOS address space, such as by using the well known system service interrupt 15H of BIOS 40 which is invoked by setting the well known register AH (not shown) of microprocessor 12 to the MOVE BLOCK function 87H. Such function transfers a block of data from storage above the IMB protected mode address range by switching to the protected mode. RAM LOADER 51 is invoked using interrupt 2BH and accesses the information from items 42 and 46 to load the ROM header at initialization time, check for the existence of a module in ROM, load a module from ROM, and access flag 58 in CMOS RAM 20.

RAM LOADER 51, IFS HANDLER 53, and CHECKC.COM 63 are new with the invention, while the remaining programs stored in ROM 16 perform functions previously commercially available. ROM 16 may optionally be of a larger size to store additional programs such as a code page switching program, a program providing extended keyboard layout, support for other national languages, etc. It may also contain alternative AUTOEXEC.BAT and CONFIG.SYS files 102 and 104 oriented to the use of such additional programs. The size of ROM 16 may thus vary dependent upon the size of and how many additional support programs are stored. Preferably, those items shown in FIG. 3 are stored in a 128K ROM unit and the additional programs are stored in a second 128 K ROM unit.

FIG. 3 also illustrates another facet of the invention which is that the data and programs of ROM DOS 34 are stored in ROM 16 in a file system using a packed format. In contrast, any data and files stored on disk 24, including those in RAM DOS 36, are stored in the conventional DOS FAT file system in which information is stored in clusters and sectors. In the FAT file system, if a particular program doesn't have the same number of bytes as are in a sector or cluster, space is wasted. On the average, about one half the number of bytes in a cluster or in a sector are wasted for each file. Since ROM units are more expensive than disk storage, any wasted space is inefficient. Thus, in ROM 16, the ROM DOS 34 files are stored beginning at a segment address, each segment being sixteen bytes. Each succeeding file begins immediately at the next segment location following the end of a preceding file so that on average only eight bytes per file would be wasted, such number being far less than the average waste in a FAT file system. By way of example, suppose file 50 begins at ROM segment X and ends at Y. Then, the succeeding file 52 begins at segment Y+n, where n is less than sixteen. The other files are similarly stored.

When system 10 is first setup, it is desireable to customize the system in a manner similar to that in which IBM PS/2 systems are configured. During the course of such customization the user has to make decisions and define what features are to be used. The primary decision pertinent to the invention is whether to boot the system from ROM, in accordance with the invention, or to boot the system from disk 24 in the manner of the prior art. The selection of the option is then coded into a flag 58 which is stored during customization in CMOS RAM 20. Other options for the user are whether the system will be started by using the ROM based CONFIG.SYS 62 and/or AUTOEXEC.BAT 61, or the user defined CONFIG.SYS 102 or AUTOEXEC.BAT 102 files stored on disk 24. Flag 58 will also be set to reflect such other options. Default values are provided for such options so that in the absence of selecting other options, the system will automatically boot from ROM 16 and process the AUTOEXEC.BAT and CONFIG.SYS files therein.

To accomplish such selections, flag 58 may be a sixteen bit flag including the following bits:

SSSSS—SYS-DRIVE
 Represents a valid disk or diskette drive number from 0-25. If the system has a hard disk, the default is 2, c: drive. If there is no hard disk, the value is 0, A: drive.
B—conventional boot
 set=1 to boot as if there is no ROM DOS, and set=0 boot from ROM
D—boot diskette
 set=1 to try and boot from diskette
C—CONFIG
 set=0 to use default CONFIG.SYS 62 in ROM, and set=1 to use CONFIG.SYS 102 in default drive.
A—AUTOEXEC
 set=0 to use default AUTOEXEC.BAT 62 in ROM, or set=1 to use AUTOEXEC.BAT 104 in default drive.
R—ROMSHEL1
 set=1 to load COMMAND.COM with /R option to load ROMSHELL, or set=0 to load default COMMAND.COM to display command line prompt.
I—INITIAL ROMSHELL STATE
 set=0 for ROMSHELL to initialize with first panel, or set=1 for ROMSHELL to begin directly with a subpanel.

If the user selects to use files 102 or 104 on drive 24 and such file(s) cannot be found, the default files in ROM 16 are used.

ROM IDENTIFICATION INFO 16 contains the following information defining a valid ROM DOS module:
 Byte 0: Hex 55
 Byte 1: Hex AA
 Byte 2: A length indicator representing the number of 64 KB blocks in the ROM DOS module.
 Byte 3: Boot flag byte.
 Byte 4: Low byte of offset word from byte 0 to beginning of ROM DOS boot record.
 Byte 5: High byte of offset word.
 Bytes 6-B: Reserved.
 Bytes C-F: Bytes for test.
 Bytes 10-17: Code part number.
 Bytes 18-??: Copyright statement.
 Remaining bytes: ROM DOS date.

The MODULE INFORMATION AND DATA 46 is a table containing one twenty byte entry for each module (file) in DOS ROM 34. Such information can be readily used to locate and read the files within the ROM. Each entry includes the following:
 Bytes 1-12: Module name.
 Byte 13: Module name length.
 Bytes 14-17: Segment pointer to module in ROM.
 Byte 18: Module attribute flag.
 Bytes 19-20: Size of module in bytes.

Figure 5A:
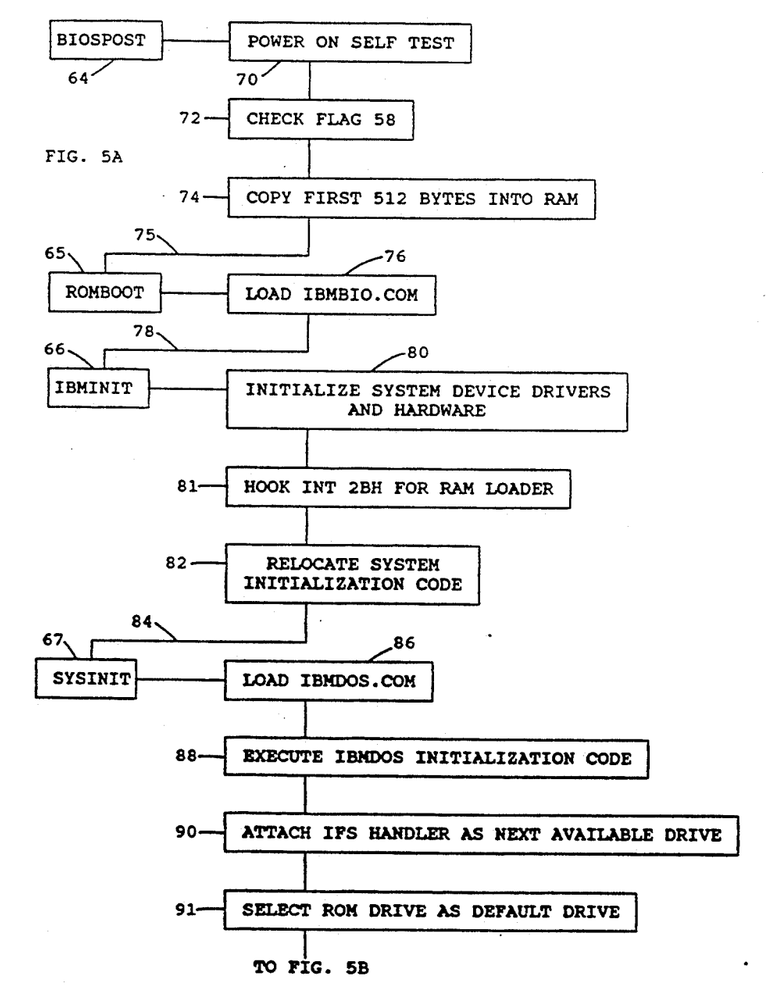
FIGS. 5A and 5B form a flow chart illustrating the order in which general operations of the invention are performed.
Figure 5B:
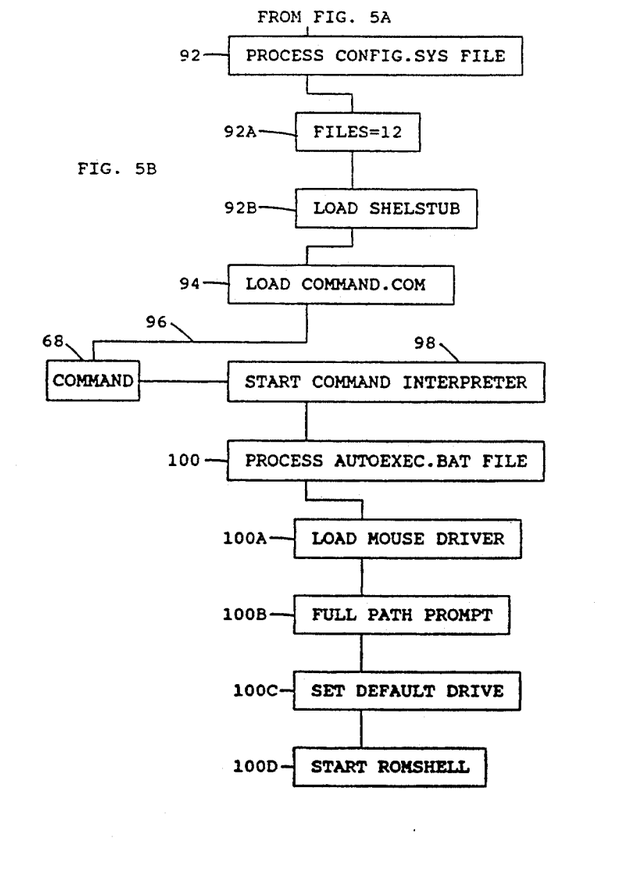

The general operation of system 10 in accordance with the invention will now be described with reference to FIG. 5. In such figure, the legends to the left are the names of different processes and general functions that occur when system 10 is turned on, and the boxes to the right illustrate the various more detailed steps that occur in performing such general functions. The steps are performed by microprocessor 12 operating under program control to control the operation of the various components within system 10. When system 11 is turned on, the general sequence of operations that occur are BIOSPOST 64, ROMBOOT 65, IBMINIT 66, SYSINIT 67, and COMMAND 68. BIOSPOST 64 first performs a power on self test 70 which is the same as or similar to what is done within the prior art. Upon successful completion of such test, step 72 then checks flag 58 to see if the fast boot process of the invention has been selected. If it has not, then the system would boot from disk 24 in accordance with the prior art. If such selection was made, then step 74 copies the first 512 bytes of ROM DOS 34 into RAM 14 at the top of such memory, the bytes thus copied including ROMBOOT 48. Control is then passed via step 75 to ROMBOOT 65 by jumping from POST to instruction 44 and then to the start of ROMBOOT program 48.

ROMBOOT 65 first loads IBMBIO.COM 50, including RAM LOADER 51, from ROM 16 into RAM 14 by step 76. IBMBIO.COM includes two code segments, IBMINIT and SYSINIT. Step 78 then transfers control to IBMINIT 66. Step 80 initializes the system device drivers and hardware. Step 81 provides or sets up a hook into interrupt handler INT 2BH for the RAM LOADER. Step 82 relocates the initialization routine of IBMBIO.COM 50 to predetermined locations at the top of the DOS address space in RAM 16. Next, step 84 transfers control to SYSINIT 67 which first, by step 86, loads IBMDOS.COM 52 from ROM 16 into RAM 14. Step 88 then executes the initialization routine of IBMDOS.COM. Afterwards, step 90 attaches the IFS Handler as the next available drive which is drive D: because system 10 includes a fixed disk drive. Next, step 91 selects the ROM drive created by the IFS handler, as the defualt drive.

Then, step 92 processes CONFIG.SYS 62 file and performs step 92A and B. Step 92A set the maximum number of files that can be opened at any given time to twelve which is a number greater than the default value and is suitable for most application programs. Step 92B then loads SHELSTUB 59 into RAM where it becomes resident. Step 94 loads COMMAND.COM 54 from ROM 16 into RAM 14, and step 96 transfers control to COMMAND 68. Step 98 first starts the command interpreter contained in COMMAND.COM and step 100 processes AUTOEXEC.BAT 61 which then performs steps 100A-D. Step 100A loads the mouse driver by loading and executing MOUSE.COM program 60. Step 100B set a full path prompt, and step 100C sets the default drive by loading and executing CHECKC.COM program 63. Such program first checks to see if the system contains a hard drive and then sets the default to drive C or drive A depending on whether the hard disk is present or not. The purpose of such action is to overcome the fact that DOS normally makes the drive from which DOS is loaded to be the default drive, but since loading is done from ROM, which cannot be written into, a disk or diskette is selected as available for the default drive. Finally, step 100D starts the ROM-SHELL program 57 from the SHELSTUB program 59 previously loaded into RAM 16. The first screen of the ROMSHELL program is presented to the user at the end of the display warmup.

Steps 92 and 100 also include the sub-steps of checking flag 58 to see if the user has selected to process the user files 102 and/or 104. If so, then such files are processed. Since such files are on the disk, and not in ROM, such processing will take longer and may introduce some delay with the result that the system may not appear to "instantly" turn on as would be the case if the ROM files 61 and 62 were processed.

Figure 4:
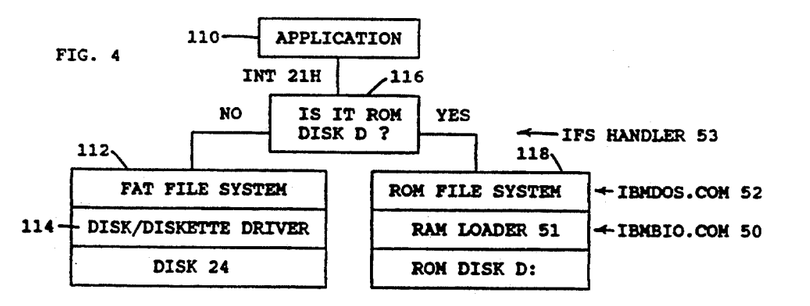
FIG. 4 is a schematic diagram illustrating another aspect of the invention.

FIG. 4 illustrates the relative position and use of IFS HANDLER 53. Within the prior art, an application program 110 can be thought of as sitting on top of FAT file system 112, which in turn sits on top of disk/diskette driver 114 which overlies the disk 24 containing the actual files and data. Application 110 uses interrupt INT 21H to access the file system through IBMDOS.COM, which acts through IBMBIO.COM to access the disk. In accordance with the invention, IFS HANDLER 53 is interposed at the file system level in the INT 21H process and decides in step 116 whether the desired file system access is to be made to ROM DISK D:. If not, the system proceeds as in the prior art to access the FAT file system. If the desired access is to be made to ROM DISK D:, it is done through the ROM file system 118 and RAM LOADER 51 by programs IBMDOS.COM 52 and IBMBIO.COM 50. The term "ROM DISK" is defined hereby to mean a ROM unit containing images of files storable on a hard disk or floppy diskette, which images are stored in a packed format in a ROM file system, that is different from the FAT file system used to store files on a disk or diskette.

The IFS interface "connects" the ROM as an installable file system and assigns it a drive letter to be referenced. Such interface performs calls at a file system level as opposed to other systems which operate at the disk level. Examples of interfaces operating at the system level are OPEN, READ, CLOSE, etc. Examples of interfaces which operate at the disk level are READ SECTOR, and WRITE SECTOR. Operating system performance is improved since file system calls are identified earlier in the code path than disk calls. Further, in view of the relative simplicity of the ROM file structure in comparison to the complex file structure of the FAT file system, it is obvious that the amount of code necessary to access the ROM file system is substantially less than the amount of code necessary to access the FAT file system. Thus performance is faster because less code has to be executed and because the FAT file system code is bypassed due to the system level interrupt being located in the code path prior to the FAT file system code in IBMDOS.COM.

As an alternate embodiment, the MODULE INFORMATION AND DATA 46 can have twenty byte entries to allow a six byte address to be used in place of the four byte segment pointer previously described. This then packs the files with no wasted space.

In summary, the invention of a ROM based DOS provides several features and advantages. DOS is rapidly loaded from ROM and executed in RAM to instantly boot up and present the user with a screen from a graphical user interface. Once booted, ROM DOS executes normally and acts the same as standard disk DOS and has the same system compatibility as disk DOS. Further, no DOS installation is required to be done by a user, and the user has no diskette dependencies. The invention is further advantageous by virtue of using the IFS interface and allowing the ROM to appear as a "drive", since this minimizes the number of changes to the basic DOS programs, which reduced developement time and minimized the possibility of error being introduced by new code.

It should be apparent to those skilled in the art that many changes can be made in the details and arrangements of steps and parts without departing from the scope of the invention as defined in the appended claims.

What is claimed is;

1. A personal computer comprising:
    a disk drive for storing files in clusters of sectors, said disk drive haivng a disk based file system that comtpises a file allocation table (FAT) and directory means for locating and accessing said files;
    a microprocessor that operates in a real mode and in a protected mode;
    a memory system comprising a random access memory (RAM), a first read only memory (ROM), and a second ROM, said memory system having a memory address space including a first region, which is accessible when said microprocessor operates in either one of said modes, and a second region which is accessible only when said microprocessor operates in said protected mode;
    said first ROM and said RAM are located in said first region, and said second ROM is located in said second region, of said memory address space;
    said first ROM storing a power-on self test (POST) program;
    said second ROM storing a ROM disk operating system (DOS) comprising
        DOS kernal programs for providing minimum operating system support for operating said personal computer, said DOS kernal programs further comprising initialization code for setting up said personal computer and a RAM loader program for loading programs from said second ROM into said RAM, additional DOS programs for providing, in conjunction with said DOS kernel programs, full operating system support for operation of said personal computer, and a bootstrap record containing information for accessing said DOS programs in said second ROM, and a ROMBOOT program for loading said DOS kernel; and boot-up means, including said microprocessor, for booting said personal computer in response to said personal computer being powered on, said boot-up means being operative to execute said POST program to thereby test said personal computer, to load said bootstrap record from said second ROM into said RAM, to execute said ROMBOOT program and load said DOS kernel programs into said RAM from said second ROM, and to execute said initialization code to thereby set up said personal computer for further operation under said ROM DOS.

2. A personal computer in accordance with claim 1 further comprising;

a disk DOS stored in said disk drive;

and a non-volatile memory containing a flag for controlling which DOS will be booted when said personal computer is powered on or reset, said flag being set to one of two conditions, a first condition for booting said personal computer from said ROM DOS stored in said ROM, and a second condition for booting said computer from said DOS programs stored in said disk drive.

3. A personal computer in accordance with claim 1 comprising:

an installable file system (IFS) for accessing said ROM as a disk drive, said IFS including an IFS handler for accessing said DOS programs in said ROM, said IFS handler being contained in said DOS kernel programs loaded from ROM and operative when called to access said ROM DOS.

4. A personal computer in accordance with claim 2 comprising:

an AUTOEXEC.BAT file and a CONFIG.SYS file stored in said ROM; and said microprocessor being further operative to load said AUTOEXEC.BAT file and said CONFIG.SYS file from ROM into RAM along with said DOS kernel programs, and to process said ATUOEXEC.BAT file and said CONFIG.SYS file during initialization of said personal computer.

5. A personal computer in accordance with claim 4 comprising;

a user AUTOEXEC.BAT file and a user CONFIG.SYS file stored in said disk drive;

said flag containing a second bit and a third bit settable to first and second values for respectively controlling the loading and processing of said AUTOEXEC.BAT files and said CONFIG.SYS files.

6. A personal computer in accordance with claim 4, comprising:

a display connected to said microprocessor for providing a user with a visual output from said personal computer system, said display requiring a warmup period immediately after said computer system has been turned on in order to present a visually perceptible screen;

and a graphical user interface program stored in said ROM for creating a graphical user interface comprising at least one screen;

said microprocessor also being operative to load said graphical user interface program from said ROM into said RAM and then execute it to output said one screen at the end of said warmup period and provide an appearance, to the user, of an instant startup of said personal computer.

7. A personal computer that operates under a disk operating system (DOS), comprising:

a microprocessor that operates in a real mode and in a protected mode;

a memory system comprising a random access memory (RAM), and a read-only memory (ROM), said memory system having a memory address space including a first region, which is accessible when said microprocessor operates in either one of said modes, and a second region which is accessible only when said microprocessor operates in said protected mode;

said RAM is located in said first region, and said ROM is located in said second region, of said memory address space;

an installable file system (IFS) for accessing said ROM as a ROM disk drive;

said ROM having a ROM file system for storing a ROM DOS comprising

DOS kernel programs for providing minimum operating system support for operation of said personal computer, said DOS kernel programs further comprising initialization code for setting up said personal computer, a RAM loader program or loading programs from said ROM into said RAM, and an IFS handler for accessing said ROM disk drive, additional DOS programs for providing, in conjunction with said DOS kernel programs, full operating system support for operation of said personal computer, and a bootstrap record containing information for accessing said DOS program in said second ROM, and a ROMBOOT program for loading said DOS kernel; and boot-up means, including said microprocessor, for booting said personal computer in response to said personal computer being powered on, said boot-up means being operative to execute said POST program and thereby test said personal computer, to load said bootstrap record from said second ROM into said RAM, to execute said ROMBOOT program and load said DOS kernel programs into said RAM from said second ROM, to attach said IFS and create said ROM disk drive, and to execute said initialization code to thereby set up said personal computer for further operation under said ROM DOS.

8. A PCS in accordance with claim 7 comprising;

accessing means operative during said further operation of said PCS for executing said IFS handler each time said ROM disk is accessed.

9. A PCS in accordance with claim 8 wherein said accessing means comprises an interrupt handling routine in said DOS kernel for invoking said IFS handler to access a program in said ROM.

10. A PCS in accordance with claim 7 comprising;

a display providing a user with a visual output from said PCS, said display requiring a warmup period after said PCS has been turned on in order to provide a visually perceptible screen; and said boot-up means being operative to output an initial screen visible to the user at the end of said warmup period to provide an appearance to the user of an apparent instant startup of said personal computer system.

11. A PCS in accordance with claim 10 comprising:
a graphical user interface program stored in said ROM for displaying at least one screen to the user; and
said boot-up means being operative to execute said graphical user interface program to display said one screen as said initial screen.

12. A PCS in accordance with claim 11 comprising:
an AUTOEXEC.BAT file and a CONFIG.SYS file stored in said ROM;
said boot-up means being operative to load said AUTOEXEC.BAT file and said CONFIG.SYS file from ROM into RAM along with said DOS programs, and to process said AUTOEXEC.BAT file and said CONFIG.SYS file; and
said graphical user interface program comprising a first resident portion loaded into said RAM while processing said CONFIG.SYS file and a second transient portion loaded into said RAM while processing said ATUOEXEC.BAT file.

13. The method of operating a personal computer comprising a disk drive for storing files in clusters of sectors, said disk drive having a disk based file system that comprises a file allocation tale (FAT) and directory means for locating and accessing said files; a microprocessor that operates in a real mode and in a protected mode; a memory system comprising a random access memory (RAM), a first read only memory (ROM), and a second ROM, said memory system having a memory address space including a first region, which is accessible when said microprocessor operates in either one of said modes, and a second region which is accessible only when said microprocessor operates in said protected mode; and said first ROM and said RAM are located in said first region, and said second ROM is located in said second region, of said memory address space; said method comprising:
storing a power-on self test (POST) program in said first ROM;
storing a ROM disk operating system (DOS) in said second ROM, aid ROM DOS comprising
DOS kernel programs for providing minimum operating system support for operating said personal computer, said DOS kernel programs further comprising initialization code for setting up said personal computer and a RAM loader program for loading programs from said second ROM into said RAM,
additional DOS programs for producing, in conjunction with said DOS kernel programs, full operating system support for operation of said personal computer, and
a bootstrap record containing information for accessing said DOS programs in said second ROM, and a ROMBOOT program for loading said DOS kernel; and
booting said personal computer in response to said personal computer being powered on, by steps comprising
executing said POST program to thereby test said personal computer,
loading said bootstrap record from said second ROM into said RAM,
executing said ROMBOOT program to load said DOS kernel programs into said RAM from said second ROM, and
executing said initialization code to thereby set up said personal computer for further operation under said ROM DOS.

14. The method in accordance with claim 13 further comprising:
storing a disk DOS in said disk drive;
storing, in a non-volatile memory, a flag for controlling which DOS will be booted when said personal computer is powered on; and
setting said flag to one of two conditions, a first condition for booting said personal computer from said ROM DOS stored in said ROM, and a second condition for booting said computer from said DOS programs stored in said disk drive.

15. The method in accordance with claim 13 comprising:
accessing said ROM as a disk drive, utilizing an installable file system (IFS) said IFS including an IFS handler for accessing said DOS programs in said ROM, said IFS handler being contained in said DOS kernel programs loaded from ROM and operative when called to access said ROM DOS.

16. The method in accordance with claim 14 comprising:
storing an AUTOEXEC.BAT file and a CONFIG.SYS file in said ROM;
loading said AUTOEXEC.BAT file and said CONFIG.SYS file from ROM into RAM along with said DOS kernel programs; and
processing said AUTOEXEC.BAT file and said CONFIG.SYS file during initialization of said personal computer.

17. The method in accordance with claim 13, wherein said system comprises a display connected to said microprocessor, said method comprising:
warming up said display during a period immediately after said computer system has been turned on; and
and, when said display has been warmed up, presenting a visually perceptible screen on said display, to provide an appearance, to the user, of an apparent instant startup of said personal computer.

* * * * *